Sept. 1, 1925.
E. A. MILLER
AUTO SAFETY SIGNAL COMBINATION
Filed March 24, 1922
1,551,831
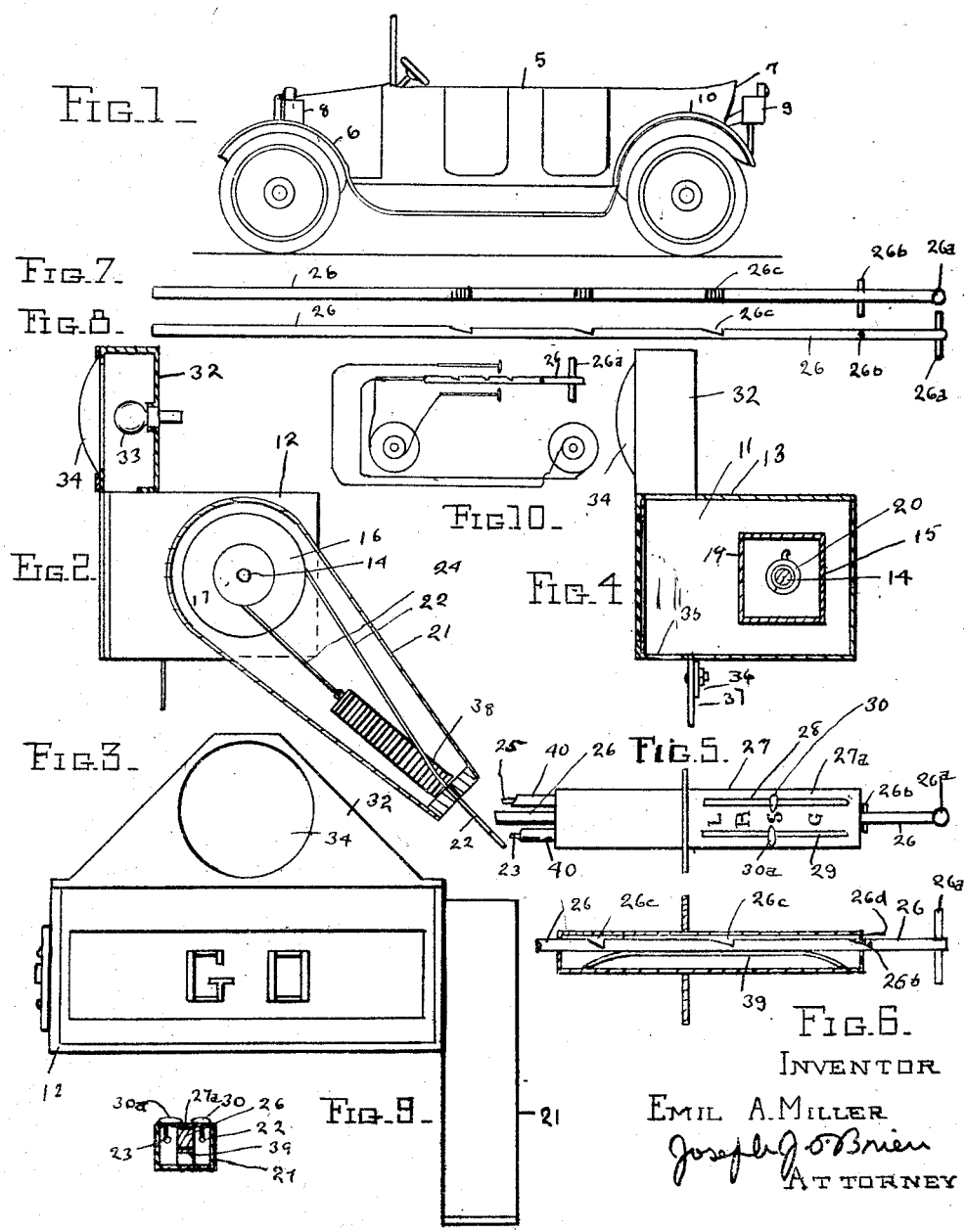
INVENTOR
EMIL A. MILLER
Joseph J. O'Brien
ATTORNEY Patented Sept. 1, 1925.

1,551,831

UNITED STATES PATENT OFFICE.

EMIL A. MILLER, OF PALMER, MASSACHUSETTS.

AUTO SAFETY-SIGNAL COMBINATION.

Application filed March 24, 1922. Serial No. 546,541.

*To all whom it may concern:*

Be it known that EMIL A. MILLER, citizen of the United States of America, residing at 12 Barlot St., Palmer, in the county of Hampden and State of Massachusetts, has invented certain new and useful Improvements in Auto Safety-Signal Combinations, of which the following is a specification.

This invention relates to improvements in direction signals for automobiles and other vehicles and its leading object is to provide a signaling device which can be operated from the driver's seat and which will give a positive direction signal to the traffic officer or the drivers of other automobiles or vehicles, and will also indicate to the operator of the signal the action of the signaling element employed for signaling the traffic officer or traffic.

Another object of the invention is the provision of a set of signaling devices, one for the forward end of the vehicle or automobile and the other for the rear end of the vehicle, and an operating device for simultaneously operating both signaling devices, which will indicate the signaling positions of both of the devices.

With the above and other objects in view the invention consists in certain new and useful constructions, combinations and arrangements of parts, clearly described in the following specification and fully illustrated in the accompanying drawings, in which:—

Fig. 1 is a side elevation of an automobile equipped with my improved signaling system.

Fig. 2 is a side elevation, on an enlarged scale, and partly in section, of one of the devices.

Fig. 3 is a transverse sectional view thereof.

Fig. 4 is a front elevation of one of the devices.

Fig. 5 is a top plan view of the operating member.

Fig. 6 is a longitudinal sectional view thereof.

Fig. 7 is a top plan view of the operating rod.

Fig. 8 is a side elevation thereof.

Fig. 9 is a transverse sectional view of the operating member.

Fig. 10 is a diagrammatic view showing the connection between the operating rod and the forward and rear signaling devices.

Referring to the accompanying drawings 5 designates an automobile or other vehicle, which is shown to be provided with a front wheel fender 6 and with a back 7. On the fender 6 a signaling box 8 is mounted and against the back 7 a similarly constructed signaling box 9 is mounted, though this box may be mounted on the rear wheel fender 10, or otherwise supported, and the front signaling box may be arranged in any other manner than that herein indicated.

The interior arrangement of one box is similar to that of the other box, so that it is deemed necessary to describe only one box. Each box includes end walls 11 and 12. The end wall 11 is formed with a relatively large opening which is closed by means of a plate 13, to which one end of the shaft 14 of the signaling drum 15 is journaled. The other end of the shaft extends through the end wall 12 and carries the large pulley 16 and the small pulley 17 which is formed integral with the large pulley. This compound pulley is keyed to the shaft 14 by means of a pin or the like, the withdrawal of which will permit the removal of the compound pulley. The shaft 14 carries within the box a signaling element or drum 19, which is shown to be formed with plane faces on which the signaling indicia is arranged, the same being painted, printed, stenciled or otherwise affixed thereto. A helical spring 20 is arranged within the drum 19, with one end fixed to the plate 13 and the other end fixed to the shaft 14, so that the drum will be held in its initial signaling position and be automatically returned to such position when manually released by the operator. In the construction shown the drum is formed with four side faces, and on these faces the signal indicia of "Go," "Stop," "Right," "Left" is arranged, so that one of said words will be moved into position when a partial rotation is given to the drum.

On the side of the box 8 a housing 21 is mounted in angular relation to the side of the box, and this housing encloses the compound pulley. On the larger pulley a chain or the like 22 is connected, and to this chain the flexible wire 23 is connected. This chain is wound on the larger pulley so that when it is unwound it will impart a three quarters revolution to the drum. On the smaller pulley another chain 24 is connected, which is designed to be wound when the chain 22 is unwound, and to the chain 24 a flexible wire 25 is connected. The wire 23 is connected to the operating rod 26, which works in a housing 27, mounted on the dash board or otherwise supported on the vehicle.

The housing 27 is formed with a side wall 27ª which is provided with two parallel and independent slots 28 and 29. A pointer 30 works along the slot 28 and is connected to the wire 25. The side wall 27ª is provided with a series of signal indicating points or stops, corresponding to the indicia carried by the drum, and arranged in corresponding order to that of the drum. The operating rod 26 is provided with a terminal handle 26ª and with a cross pin 26ᵇ which limits the inward movement of the rod in the housing against the pull exerted by the rewinding spring of the drum. This rod 26 is also provided with three other stops, which are shown to be in the form of notches 26ᶜ, and which are spaced longitudinally from each other so as to permit of the adjustment of the rod a distance corresponding to the pull required to rotate the drum a quarter of a revolution. The rod 26 is also connected to the wire 23ª of the box 9 so that when said rod 26 is pulled the drums of both boxes will be rotated. The box 9 is provided with a compound pulley like the box 8 and to the smaller pulley thereof the wire 25ª has similar chain connection, and this wire 25ª is connected to the pointer 31 which works in the slot 29 of the front wall 27ª.

Above each box a light housing 32 is arranged, so that the face of the drum will be illuminated, and in this housing 32 a small electrical lamp 33 is arranged and is suitably wired with the lighting system of the vehicle. The side wall of the housing 32 is provided with a red glass window 34, and if desired, both sides of the housing 32 may be similarly equipped, so that a red light will be shown when the lamp is energized. The side wall of the housing of each signal box is also provided with an opening which is closed by means of a plain glass so that the drum will be always visible. The bottom of each signal box is provided with a light opening 35 and on one side of this opening the flange 36 is located, to which the license number plate 37 may be attached.

In order to insure a more positive return of the signal drum to normal position an auxiliary spring 38 is employed, one end of which is connected to the chain of the smaller pulley and the other end of which is connected to the housing attached to the side of the signal box which encloses the compound pulley. The operating rod is pressed against the front wall 27ª by means of a bowed leaf spring 39, as shown in Fig. 6. By pressing the rod inwardly and then exerting an endwise pull upon the same it may be shifted in and out of the housing 27.

When the operating rod is pulled the signal drum in each box will be rotated an equal distance and the indicating pointers on the housing 27 will be moved a distance along the face of the housing to indicate the exact positions of the signal drums, so that the operator will positively know what signals have been given the traffic officer or traffic. The wires connecting the operating parts to the rod 26 and the pointers of the housing are preferably arranged in copper tubes 40.

Having described my invention I claim:—

A road vehicle signaling device consisting of a member having a plurality of signals, a shaft for said member carrying a double pulley, an operating element connected with said pulley on the pulling of which the member may be moved, a casing adapted to be positioned near the driver's seat, a notched rod slidable through the casing and having connection with said operating element, a spring for forcing said rod into latching engagement with said casing, a pair of independent indicators movable on said casing, means connecting one indicator to the operating element first-named, and means connecting the other indicator to one of the pulleys.

Signed by me at Springfield, Massachusetts.

EMIL A. MILLER.